US012657363B2

(12) United States Patent
Shih et al.

(10) Patent No.: US 12,657,363 B2
(45) Date of Patent: Jun. 16, 2026

(54) DETERMINING AGING EFFECTS FOR A CIRCUIT DESIGN

(71) Applicant: Synopsys, Inc., Mountain View, CA (US)

(72) Inventors: Wei-Kai Shih, Hsinchu City (TW); Hsien-Han Cheng, Hsinchu City (TW); Li Ding, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 822 days.

(21) Appl. No.: 18/062,773

(22) Filed: Dec. 7, 2022

(65) Prior Publication Data

US 2023/0359796 A1    Nov. 9, 2023

Related U.S. Application Data

(60) Provisional application No. 63/327,652, filed on Apr. 5, 2022.

(51) Int. Cl.
 *G06F 30/3315* (2020.01)
 *G06F 30/327* (2020.01)
 *G06F 119/04* (2020.01)
 *G06F 119/12* (2020.01)

(52) U.S. Cl.
 CPC ........ *G06F 30/3315* (2020.01); *G06F 30/327* (2020.01); *G06F 2119/04* (2020.01); *G06F 2119/12* (2020.01)

(58) Field of Classification Search
 USPC .......................................................... 716/108
 See application file for complete search history.

(56) References Cited

U.S. PATENT DOCUMENTS

2012/0123745 A1* 5/2012 Sheu ...................... G06F 30/367
    703/2

* cited by examiner

*Primary Examiner* — Bryce M Aisaka
(74) *Attorney, Agent, or Firm* — Patterson + Sheridan, LLP

(57) ABSTRACT

A system and method for performing circuit design analysis obtains a circuit design comprising cells. The cells are associated with cell types. Aging parameters of a core analytical model are determined for each of the cell types in the circuit design to generate a calibrated analytical model. Aging effects for the cells are determined based on the calibrated analytical model and target stress conditions. An aged timing model is determined for the cell types based on the aging effects, an unaged timing model, and the target stress conditions.

20 Claims, 8 Drawing Sheets

500

Obtain non-uniform aging conditions $\{(T_1, V_1, sp_1, t_1), (T_2, V_2, sp_2, t_2)\}$ for a circuit design — 510

Determine equivalent age-time mapping $(t_{1,eq})$ such that $F(0, T_2, V_2, sp_2, t_{1,eq}) = F(0, T_1, V_1, sp_1, t_1)$ — 520

Perform age-time merging — 530

Determine a uniform target stress condition $(T_2, V_2, sp_2, t_{1,eq} + t_2)$ — 540

DETERMINING AGING EFFECTS FOR A CIRCUIT DESIGN

RELATED APPLICATION

This application claims the benefit of U.S. provisional patent application Ser. No. 63/327,652, filed Apr. 5, 2022, which is hereby incorporated herein by reference.

TECHNICAL FIELD

The present disclosure relates to analyzing circuit designs, and, more particularly, to determining aging effects of cells to analyze circuit designs.

BACKGROUND

A circuit design includes various cells, or logic cells or standard cells. The cells are part of a standard cell library. Cells of different cell types are used to generate the circuit design. The cell types are associated with a logic function or a storage function. To analyze the circuit design, cell-level timing model is used by timing analysis to generate a timing report for the circuit design. Cell-level timing models are generated from cell characterization. When cell characterization uses a fresh transistor SPICE model, the cell characterization produces fresh cell-level timing model. When cell characterization uses an aged transistor SPICE model, the cell characterization produces aged cell-level timing model.

Two popular methods exist in industry to account for aging impact on circuit timing. In a first method, stress conditions are applied during cell characterization to generate an aged timing model (this is achieved via aged SPICE transistor model). Stress conditions are defined in terms of a temperature stress parameter, a voltage stress parameter, time parameter, and a few signal pattern parameters. In the other popular method, an aging guardband is added to a fresh timing model during timing analysis. Although the first method is significantly more accurate than the second method, the first method suffers from huge overhead computational cost during the cell characterization process. On the other hand, the second method, although being computational less expensive, suffers from large pessimism and inaccuracy in the cell characterization.

SUMMARY

In one example, a method includes obtaining a circuit design comprising cells. The cells are associated with cell types. Further, the method includes determining, for each of the cell types in the circuit design, aging parameters of a core analytical model to generate a calibrated analytical model. The method further includes determining, by one or more processors, aging effects for the cells based on the calibrated analytical model and target stress conditions, and determining, by the one or more processors, an aged timing model for the cell types based on the aging effects, an unaged timing model, and the target stress conditions.

In one example, a system includes a memory storing instructions, and a processor. The processor is coupled with the memory and configured to execute the instructions. The instructions when executed cause the processor to obtain a circuit design comprising cells. The cells are associated with cell types. Further, the processor is caused to determine, for each of the cell types in the circuit design, aging parameters of a core analytical model to generate a calibrated analytical model. The processor is further caused to determine aging effects for the cells based on the calibrated analytical model and target stress conditions, and determine an aged timing model for the cell types based on the aging effects, an unaged timing model, and the target stress conditions.

In one example, a non-transitory computer readable medium includes stored instructions, which when executed by a processor, cause the processor to obtain a circuit design comprising cells, wherein the cells are associated with cell types. Further, the processor is caused to determine, for each of the cell types in the circuit design, aging parameters of a core analytical model to generate a calibrated analytical model. The processor is further caused to determine aging effects for the cells based on the calibrated analytical model and target stress conditions, and determine an aged timing model for the cell types based on the aging effects, an unaged timing model, and the target stress conditions.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
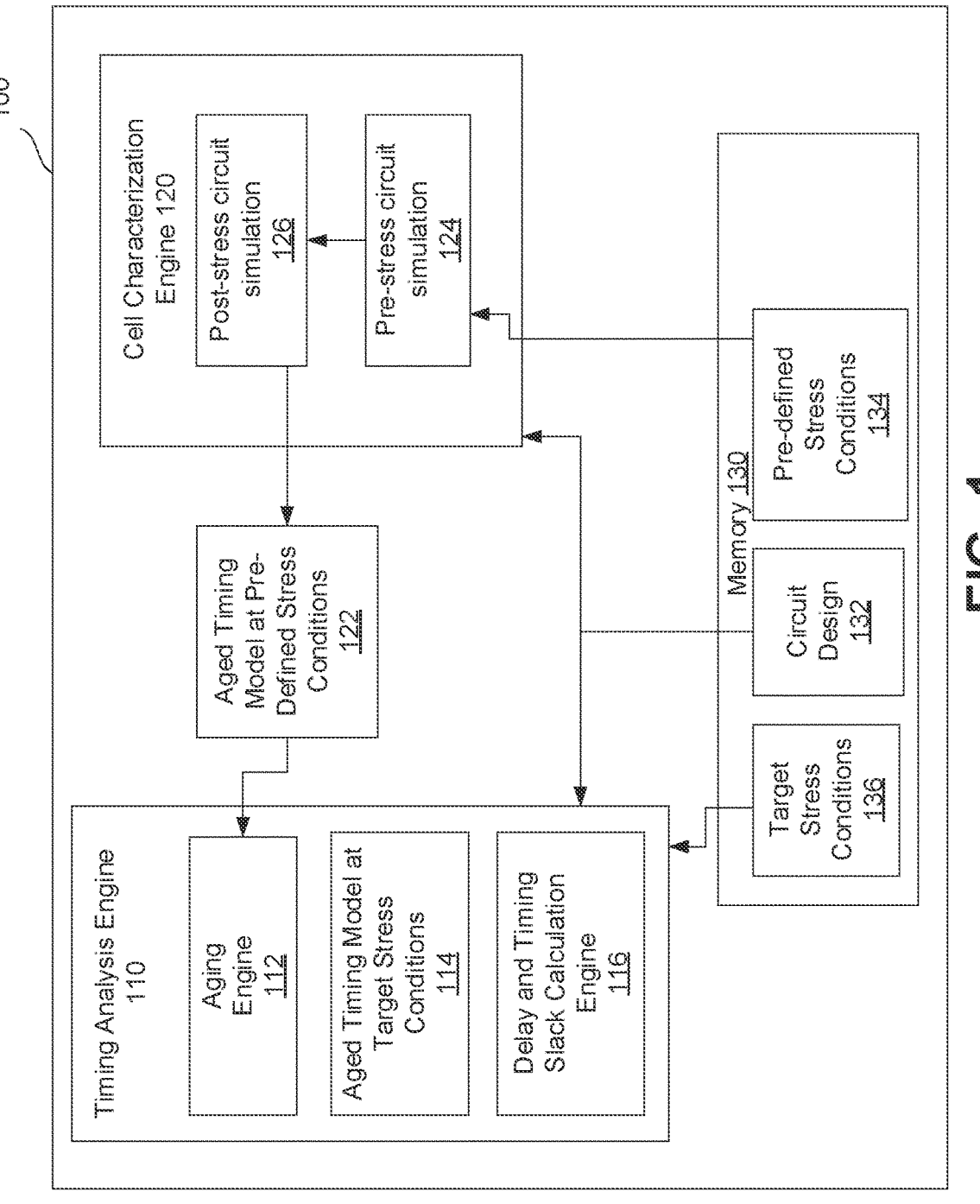
FIG. 1 depicts a schematic block diagram of a circuit evaluation system in accordance with some embodiments of the present disclosure.

Aspects of the present disclosure relate to determining aging effects for a circuit design.

In a circuit design analysis process, timing analysis (e.g., a static timing analysis or other analysis methods) is used to predict the circuit performance of the circuit design. Conventional timing analysis take into account cell aging (e.g., transistor aging within the cells) by applying an aging guardband to a fresh (i.e., non-aged) timing model during timing analysis. This often leads to an inaccurate and overly pessimistic prediction of circuit performance. The cells are logic cells or standard cells of the circuit design. The cells are part of a standard cell library. Cells of different cell types are used to generate the circuit design. The cell types are associated with a logic function or a storage function. To improve the accuracy and reduce pessimism, alternative methods apply stress conditions during cell characterization to generate an aged timing model. However, applying stress conditions during cell characterization results in a large computational cost overhead during the cell characterization process.

The circuit evaluation system and method as described herein reduces the characterization overhead by using an analytical method, which is trillions of times faster than brute-force characterization, to generate an aged timing model for timing analysis on a circuit design. In or more examples, the aged timing model may be in an industry-standard format, such as non-linear delay model (NLDM), a composite current source (CCS) delay model, or an effective current source model (ECSM), among others. The analytical method takes as input the aged timing models which are characterized with a pre-defined set of stress conditions (training stress conditions), and predict an aged timing model corresponding to a user-provided stress condition (target stress condition). In this process, computationally costly characterization needs to be performed only on the pre-defined "training" stress conditions but not on the "target" stress condition. Therefore, only a small characterization overhead is needed to cover a wide variety of target stress conditions. Stress conditions can be classified into two types. The first type of stress condition is uniform in time, while the second type of stress is non-uniform in time. A uniform stress condition is defined in terms of a single temperature stress parameter, a single voltage stress parameter, a single time parameter, and a signal pattern parameter. A non-uniform stress condition consists of a sequence of uniform stress conditions. The "target stress condition" as described in the following can be either a uniform or a non-uniform stress condition.

As will be described in greater detail in the following, the cell characterization and timing analysis process as described herein allows for a circuit design to be analyzed using less processing resources and processing time as compared to conventional cell characterization and time analysis processes. Additionally, the accuracy of analyzing a circuit design top, generating a timing model, and predicting the performance of the circuit design is improved, as compared to conventional methods. Further, the use of the cell-characterization process as described in the following uses reduced processing resources and/or processing time as compared to conventional processes, allowing for processing resources to be made available for analyzing other circuit designs and other circuit design tasks, and reducing the cost of manufacturing of a circuit device by reducing the time required to analyze a circuit design and the processing resources required to analyze a circuit. In one or more examples, reducing the time required to analyze a circuit design allows for an increased number of circuits designs to be analyzed in a shorter period of time.

FIG. 1 illustrates a circuit evaluation system 100, according to one or more examples. The circuit evaluation system 100 may be an electronic design automation (EDA) system. The circuit evaluation system 100 is used during the design and/or verification of a circuit design. The circuit evaluation system 100 includes one or more processors that execute instructions stored in a memory to predict the performance of a circuit design that is aged under a given stress condition (target stress condition). The circuit evaluation system 100 consists of a timing analysis engine 110, a cell characterization engine 120, and a memory 130 that stores design and modeling data. The cell characterization engine 130 consumes cell-level design and produces aged timing models as well as fresh timing models 122 for all cells at a circuit design at a small set of pre-defined stress conditions. The timing analysis engine 110 consumes those aged timing models characterized at pre-defined stress conditions and produces timing report at the target stress condition.

Figure 2:
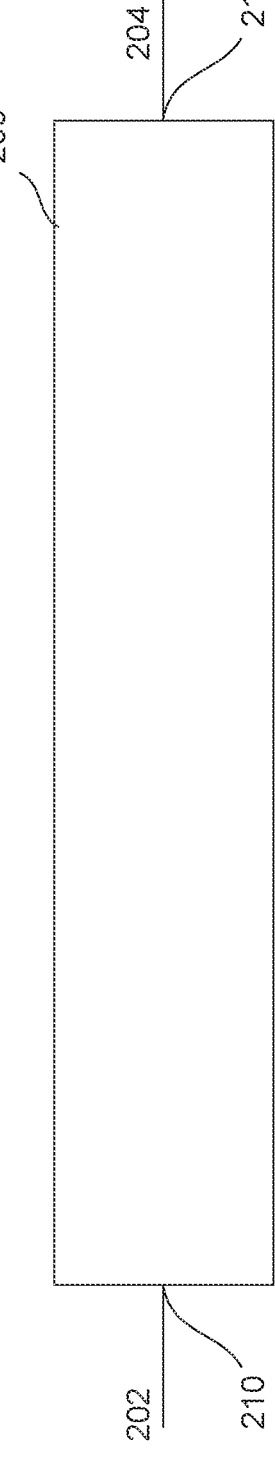
FIG. 2 depicts a cell of a circuit design in accordance with some embodiments of the present disclosure.

FIG. 2 illustrates a cell 200 of a circuit design (e.g., the circuit design 132), according to one or more examples. The cell 200 includes one or more transistors and interconnects that provide the function of the cell 200. The cell 200 receives the signal 202 at an input pin 210 and outputs the signal 204 at the output pin 212. The arc corresponds to the signal path from input pin 210 to the output pin 212. The arc delay is the time it takes a signal to travel from input pin to output pin. In one example, the amount of change in arc delay can be caused by aging of the transistors within the cell 200.

An aged timing model is generated for each cell type of a standard cell library used in a circuit design (e.g., the circuit design 132). Inside the circuit evaluation system 100, the timing analysis engine 110 consumes the aged timing model for each cell of a cell type within the circuit design. In one example, an aged timing model includes arc delay as function of an input/output environment, or an aged timing model can contain electrical parameters (capacitance/current) as functions of cell input voltage that may be used to compute delay of the corresponding circuit design. The aged timing model at pre-defined stress conditions 122 is an aged timing model generated based on pre-defined stress conditions 134. The aged timing model at pre-defined stress conditions 122 is stored in the memory 130. The aged timing model at target stress conditions 114 is an aged timing model as described above that is generated based on the target stress conditions 135. The aged timing model at target stress conditions 114 is stored in the memory 130.

The timing analysis engine 110 includes one or more processors that execute instructions stored in a memory (e.g., the memory 130). The timing analysis engine 110 includes an aging engine 112 and a delay and timing slack calculation engine 116. The aging engine 110 includes one or more processors that execute instructions stored in a memory (e.g., the memory 130). The aging engine 112 obtains aged timing model at pre-defined stress conditions 122 from the memory 130 and generates an aged timing model at target stress conditions 114. The aged timing model at target stress conditions 114 is output from the aging engine 112 and stored within the memory 130. The delay and timing slack calculation engine 116 includes one or more processors that execute instructions stored in a memory (e.g., the memory 130). The delay and timing slack calculation engine 116 analyzes the circuit design 132 based on the aged timing model at target stress conditions 114.

The cell characterization engine 120 includes one or more processors that execute instructions stored in a memory (e.g., the memory 130). The cell characterization engine 120 generates the aged timing model at pre-defined stress conditions 122 based on the circuit design 132 and the pre-defined stress conditions 134 stored within the memory 130. The cell characterization engine 120 characterizes the cells (e.g., the cell 200) of a circuit design (e.g., the circuit design 132) to determine the aging effects on the transistors at different stress conditions.

Determining the aging effects on the transistors at different stress conditions is achieved by performing a pre-stress circuit simulation 124, which generates an aged transistor-level model under each pre-defined stress condition. An aging effect on a cell (e.g., an aging effect on cell-level timing) corresponds to performance changes of a cell based on the aging effect on the transistors. In one example, as a transistor ages, the delay and/or slew (e.g., transition rate) of a signal flowing through a cell changes, causing an aging effect on cell-level timing within the cell. For example, with reference to FIG. 2, characterizing the cell 200 may be used to determine the change in arc delay of the cell 200. This is achieved by performing a post-stress circuit simulation 126, which consumes the aged transistor-level model and reports out the aged delay and slew. In one example, the cell 200 is characterized at different combinations of stress parameters to determine the delay and/or slew of the timing arc starting from 210 and ending at 212. In one or more examples, the aging effect on the cell-level timing of each cell within a circuit design is combined to determine the aging effect on the associated circuit.

Throughout this description, the terms "aging effects on transistors", "aging effect on cell-level timing", and "an aging effect on a circuit" are used. Further, in the following the description, the term "aging effect" or "aging effects" without "on transistors" or "on a circuit" refers to "an aging effect on the cell level timing" or "aging effects on cell level timing."

The stress parameters of the pre-defined stress conditions 134 may correspond to a particular stress scenario to be used in cell characterization process. For example, the stress parameters may include a voltage stress parameter, a temperature stress parameter, a time period, and a signal probability parameter that are associated with an stress scenario for testing. When pre-defined stress conditions are not provided to the cell characterization engine 120, the cell characterization engine 120 performs conventional characterization and generates a fresh timing model for each cell. Fresh timing model can be considered as a specific type of aged timing model whose time period for aging is 0.

Figure 8:
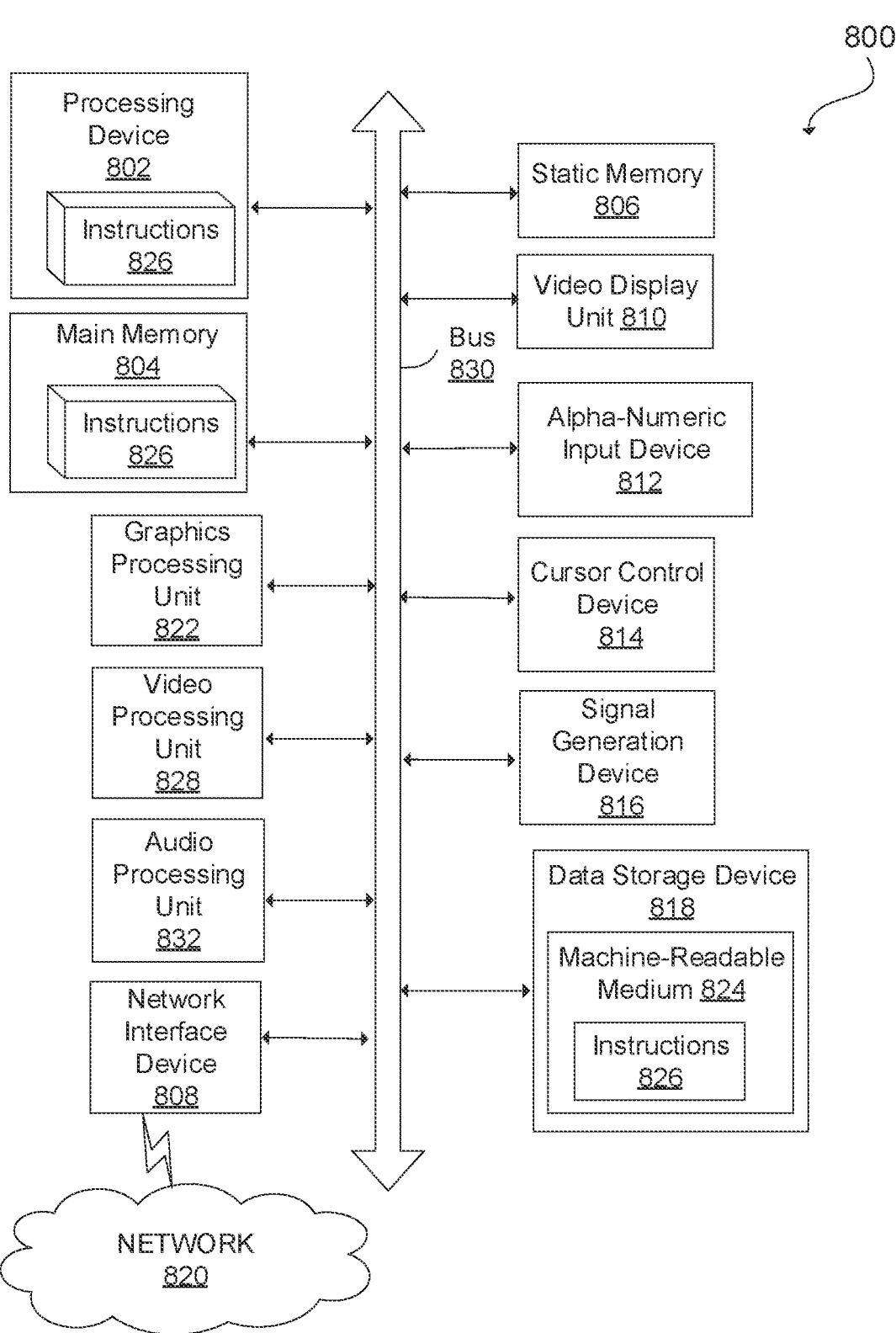
FIG. 8 depicts a diagram of an example computer system in which embodiments of the present disclosure may operate.

The memory 130 may be configured similar to that of the main memory 804 of FIG. 8 and/or the machine-readable medium 824 of FIG. 8. The memory 130 is accessible by the timing analysis engine 110 and the cell characterization engine 120.

Figure 3:
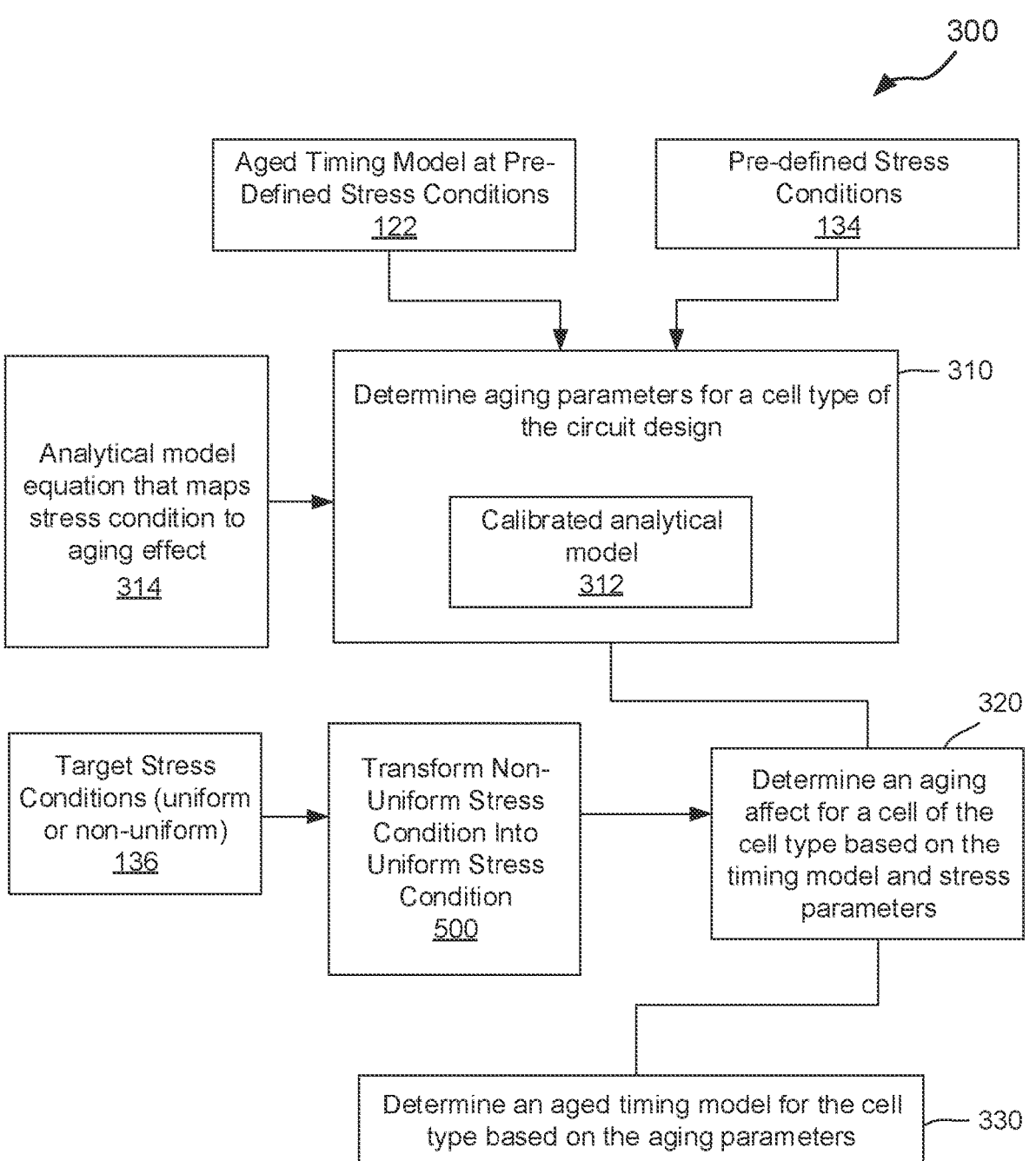
FIG. 3 depicts a flowchart of a method for analyzing a circuit design in accordance with some embodiments of the present disclosure.

FIG. 3 illustrates a flowchart of the aging engine for determining an aged timing model at an arbitrary target stress condition. In one example, one or more processors of the circuit evaluation system 100 execute instructions stored within a memory to perform the method 300. The method 300 may be performed as part of system design 714, logical design and functional verification 716, and/or synthesis and design for test 716 of FIG. 7.

In one or more examples, pre-defined stress conditions 122 and aged timing models under those conditions 134 are obtained. The aging engine 112 uses a core analytical model 314 that maps a stress condition to aging effects. The analytical model is parameterized by several aging parameters. At 310 of the method 300, aging parameters for a cell type of a circuit design are extracted. In one example, the circuit design is received, or obtained, from a memory, or another system. Further, determining the aging parameters may be referred to as extracting aging parameters. In one or more examples, extracting the aging parameters calibrates the core analytical model 314. The aging engine 112 determines the aging parameters and calibrates the analytical model 314 that maps a stress condition to an aging effect to generate the calibrated analytical model 312. With the calibrated analytical model 312 and a target stress condition (e.g., the target stress condition of method 500), the aging engine 112 determines an aging effect at 320 of the method 300. The aging effects may be referred to as predicted aging effects. Based on the aging effects, the aging engine 112 generates the aged timing model under target stress condition 114.

In one or more examples, the aging engine 112 uses one or more machine learning techniques to perform 310 of FIG. 3. In the machine learning process, the stress parameters can be treated as the features and the aging effects can be considered as dependent variables. The aging effects under pre-defined aging conditions are used as training data, and the aging effects under target stress conditions are used as testing data. In one or more examples, multivariate linear or polynomial regression with L1 or L2 regularization, among other machine learning processes, may be used.

In one or more examples, the pre-defined stress conditions 134 and the aged timing model at those conditions 122 are applied to a core equation to determine the aging parameters. An example core equation is described below with regard to Equation 1, which describes how aging effect in a timing arc depends on the stress condition. The aging parameters are unknown parameters, or variables, of the Equation 1. In one example, as will be described with regard to Equation 1 below, aging parameters are extracted such that the analytical equation produces aging effect consistent with the aged timing model at pre-defined stress conditions 122. In one example, the aging parameters are used as fixed values within the calibrated analytical model to determine an aging effect.

As is described above, the aging engine 112 applies the aging parameters and the target stress conditions 136 (uniform or non-uniform) to a core equation (e.g., Equation 1 below) to determine aging effects in 320. If the target stress condition is a uniform stress condition, it can be directly used at 320 of the method 300 to determine aging effects. In one or more examples, the target stress condition is a non-uniform stress condition. In that case, a non-uniform stress conditions is transformed into uniform stress conditions, as is further described with regard to method 500, and the uniform stress conditions are used at 320 of the method 300 to determine the aging effect of cell-level timing. As is described above, the aging effects (aging effect on cell-level timing) corresponds to a change in delay (e.g., delta delay) caused by aging transistors of a cell, resulting in an aging effect on cell-level timing. For example, with reference to FIG. 2, the aging effects correspond to a change in delay between the input pin 210 and the output pin 212. The aging effects are stored in the memory 130.

At 330 of the method 300, an aged timing model is determined at target stress conditions 114 based on the aging effects, corresponding fresh (unaged) timing models (e.g., a fresh timing model of corresponding cell type), and target stress conditions 136. The fresh timing model or models are obtained from the memory 130. An aged timing model includes arc delay as function of an input/output environment, or an aged timing model can contain electrical parameters (capacitance/current) that may be used by the timing analysis engine to compute delay of the corresponding circuit design.

As is described with regard to method 300 of FIG. 3, the aged timing model at target stress conditions 122 is generated by modeling the dependence of aging effect on voltage stress parameters, temperature stress parameters, time parameters, and signal probability parameters using one or more core equations (e.g., closed-form equations). The closed-form equations use lower-order polynomials (e.g., aging parameters) in combination with exponential functions. Equation 1 is an example closed-form equation that may be used to model a uniform aging condition for a cell type. In other examples, other types of closed-form equations may be used to generate a uniformly-aged timing model for a cell type. In one or more examples, machine learning is used to determine the closed-form equations. Equation 1 determines a change in arc delay, or a change in signal delay, within a cell. The change in arc delay is an aging effect.

$$\Delta_{ArcDelay} = \alpha \times \exp\left(-1 \times \frac{\beta}{KB \times T}\right) \times$$
$$\exp(\gamma \times V) \times t^{\delta} \times \left(a \times sp^3 + b \times sp^2 + c \times sp^1 + d\right)$$

Equation 1

In Equation 1, "T" is the temperature stress parameter, "V" is the voltage stress parameter, "t" is the time parameter, and "sp" is the signal probability parameter. Further, the variables "α", "β", "γ", "δ", "a", "b", "c", and "d" are the aging parameters. In one example, the aging engine 112 determines the aging parameters based on different values for the stress parameters "T", "V", "t", and "sp". The values for the stress parameters "T", "V", "t", and "sp" may be the pre-defined stress parameters 122 or the target stress parameters 136 . . . . In one example, to determine the values of seven variables "α", "β", "γ", "δ", "a", "b", "c", and "d", seven different combinations of pre-defined stress parameters are used. For example, combinations are formed from one or more voltage stress parameters, one or more temperature stress parameters, one or more time parameters, and one or more signal probabilities.

The pre-defined voltage stress parameters and the temperature stress parameters may be determined based on the intended operation environment of a circuit design (e.g., the circuit design 132). In one or more examples, the voltage stress parameters correspond to a maximum operating voltage for the circuit design and a minimum operating voltage for the circuit design. In other examples, other operating voltages may be used. The temperature stress parameters correspond to a maximum operating temperature and a minimum operating temperature for the circuit design. In other examples, other operating temperatures may be used. The time parameter corresponds to first and second time periods. Further, the signal probability parameter corresponds to the time-averaged logic value on each input pin of a cell. For example, the signal probability parameter having a value of 0 corresponds to a signal having a value of logic 0 at all times. Further, a signal probability parameter having a value of 1 corresponds to a signal having a value of logic 1 at all times. Values between 0 and 1, correspond with a signal having a value that varies between logic 0 and logic 1 at different rates.

Figure 4:
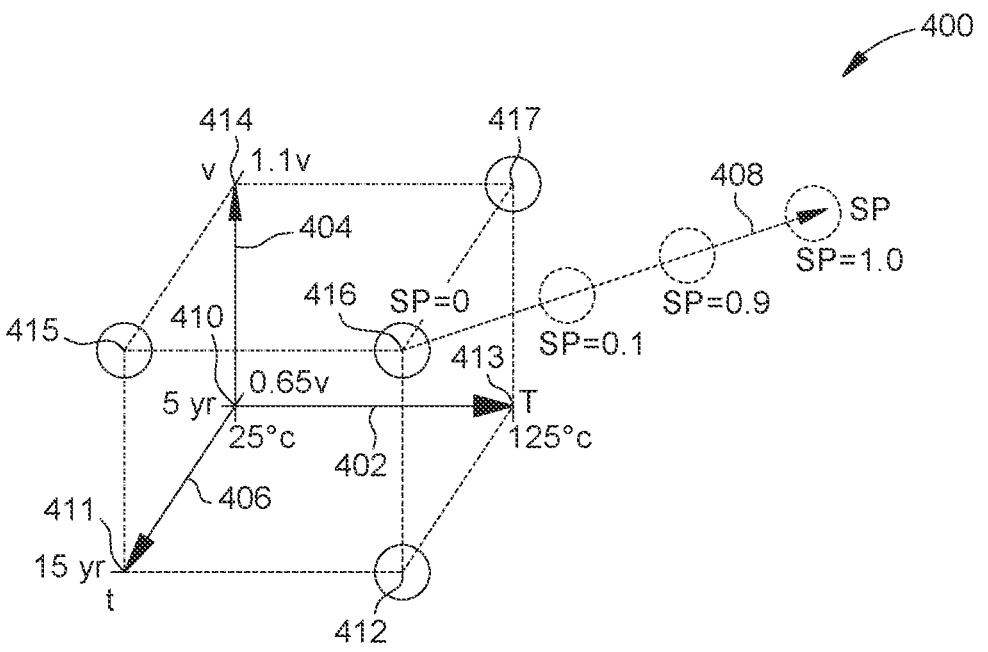
FIG. 4 illustrates a four dimensional space defined by stress parameters in accordance with some embodiments of the present disclosure.

FIG. 4 depicts the relationship between the pre-defined stress parameters. As is depicted in FIG. 4, the stress parameters are plotted using the temperature stress parameter as a first axis (e.g., axis 402), the voltage stress parameter as a second axis (e.g., axis 404), and the time parameter as a third axis (e.g., axis 406) within the four-dimensional space 400. The signal probability parameter is represented along vector 408.

In one example, the voltage stress parameters are 0.65 V (e.g., a minimum operating voltage) and 1.1 V (e.g., a maximum operating voltage), the temperature stress parameters are 25 degrees Celsius (e.g., a minimum operating temperature) and 125 degrees Celsius (e.g., a maximum operating temperature), and the first time parameter is 5 years and the second time parameter is 15 years. The voltage stress parameters, the temperature stress parameters, and the time parameters form intersections 410, 411, 412, 413, 414, 415, 416, and 418. The intersections 410, 411, 412, 413, 414, 415, 416, and 418 form the four-dimensional space 400. Each of the intersection corresponds to a maximum or minimum parameter value of the pre-defined stress parameters. For example, at intersection 410, the voltage stress parameter, the temperature stress parameter, and the time period have minimum values. At intersection 411, the voltage stress parameter and the temperature stress parameter have a minimum value and the time parameter have a maximum value. At intersection 412, the voltage stress parameter has a minimum value and temperature stress parameter and the time parameter have a maximum value. At intersection 413, the voltage stress parameter and the time parameter have a minimum value, and the temperature stress parameter has a maximum value. At intersection 414, the voltage stress parameter has a maximum value, and the temperature stress parameter and the time parameter have a minimum value. At intersection 415, the voltage stress parameter and the time parameter have maximum value, and the temperature stress parameter has a minimum value. At intersection 416, the voltage stress parameter, the time parameter, and the temperature stress parameter have a maximum value. At intersection 417, the voltage stress parameter and the temperature stress parameter have a maximum value, and the time parameter has a minimum value. Further, at intersections 410-415 and 417, the signal probability parameter has a minimum value. The minimum value, a maximum value, and intermediate values of signal probability parameter are defined with reference to the intersection 416.

In one example, the value of the signal probability parameter is in a range from 0 to 1. The intermediate values for the signal probability parameter are determined based on where the signal delay has the most variation. For example, for a signal probability parameter having a value between 0.1 and 0.9, the signal delay is stable. Further, for a signal probability parameter having a value between 0.0-0.1, and 0.9-1.0, the signal delay varies. Accordingly, the intermediate values of the signal probability parameter may be selected to be 0.1 and 0.9, as 0.1 and 0.9 represent a signal probability parameter having the largest variation.

The intersections 410-417 when combined with the signal probability parameters selected along vector 408 form the seven different combinations of stress parameters that are used to determine the aging parameters (e.g., model variables "α", "β", "γ", "δ", "a", "b", "c", and "d").

In one example, combinations of stress parameters used to determine the aging parameters may be represented as (Vmax, Tmax, tmin, sp=0), (Vmax, Tmin, tmax, sp=0), (Vmin, Tmax, tmax, sp=0), (Vmax, Tmax, tmax, sp=0), (Vmax, Tmax, tmax, sp=0.1), (Vmax, Tmax, tmax, sp=0.9), (Vmax, Tmax, tmax, sp=1.0).

As in the method 300, based on the extracted aging parameters (e.g., model variables "α", "β", "γ", "δ", "a", "b", "c", and "d"), the calibrated analytical model (e.g., Equation 1) may be used in 320 to determine the aging effects of a cell at different target stress conditions. For example, different values for the stress parameters "T", "V", "t", and "sp" may be applied to Equation 1 to determine the aging effects for a cell.

In a non-uniform aging conditions, a product (e.g., circuit) undergoes multiple aging conditions. Accordingly, the product spends a portion of time under each of the different aging conditions. In a typical circuit design analyzing method, a circuit design is analyzed for each of the aging conditions. However, such a process is processor resource and processing time extensive.

In one example, Age(t1) is the accumulated age of a cell (e.g., the cell 200) at time t1. When the cell operates under an aging condition with a temperature stress parameter "T", a voltage stress parameter "V", and a signal probability parameter "sp" for a time parameter of t2 years, the accumulated age (Age) at time t1+t2 is defined by Equation 2.

$$Age(t1+t2)=F(Age(t1),T,V,sp,t2) \qquad \text{Equation 2}$$

In Equation 2, Age(t1+t2) represents the accumulated age at time t1+t2. And the function F(Age0, T, V, sp, t) determines the outcome of the aging process (T, V, sp, t) based on (1) the initial age Age0 at the beginning of the process and (2) the aging condition (T, V, sp, t). In one example, the aging process is normally non-linear in time and F(Age0, T, V, sp, t) may not equal Age0+F(0, T, V, sp, t). Therefore, even though the value of F(0, T, V, sp, t) can be obtained from cell characterization, the value cannot be directly applied in Equation 2 to determine the accumulated age Age(t1+t2). There is an exception, however, when aging a cell from a non-aged state under (V, T, sp) for time t1 is followed by aging the cell under the same (V, T, sp) condition for time t2. In such a case, the accumulated aging effect is the same as aging the cell from the non-aged state under (V, T, sp) for t1+t2. Equation 3 describes the above relationship that is used in FIGS. 5 and 6 as described later.

$$F(F(0,T,V,sp,t1),T,V,sp,t2)=F(0,T,V,sp,t1+t2) \qquad \text{Equation 3}$$

In one example, for an aging process including N uniform aging conditions (Ti, Vi, SPi, ti), where i=1, 2, . . . , N, the accumulated aging effect at the time $t_1+t_2+ \ldots +t_N$ is described by Equation 4.

$$F(F(F \ldots F(F(0,T_1,V_1,sp_1,t_1),T_2,V_2,SP_2, \\ t2), \ldots ),T_N,V_N,sp_N,T_N) \qquad \text{Equation 4}$$

Equation 4 is complex and difficult to evaluate since determining the functional value of F(age_initial, T, V, sp, t) for an arbitrary age_initial requires increased processor resources and processing time. The method 500 of FIG. 5 describes a recursive algorithm to evaluate Equation 4, reducing processing resources and processing time.

Figure 5:
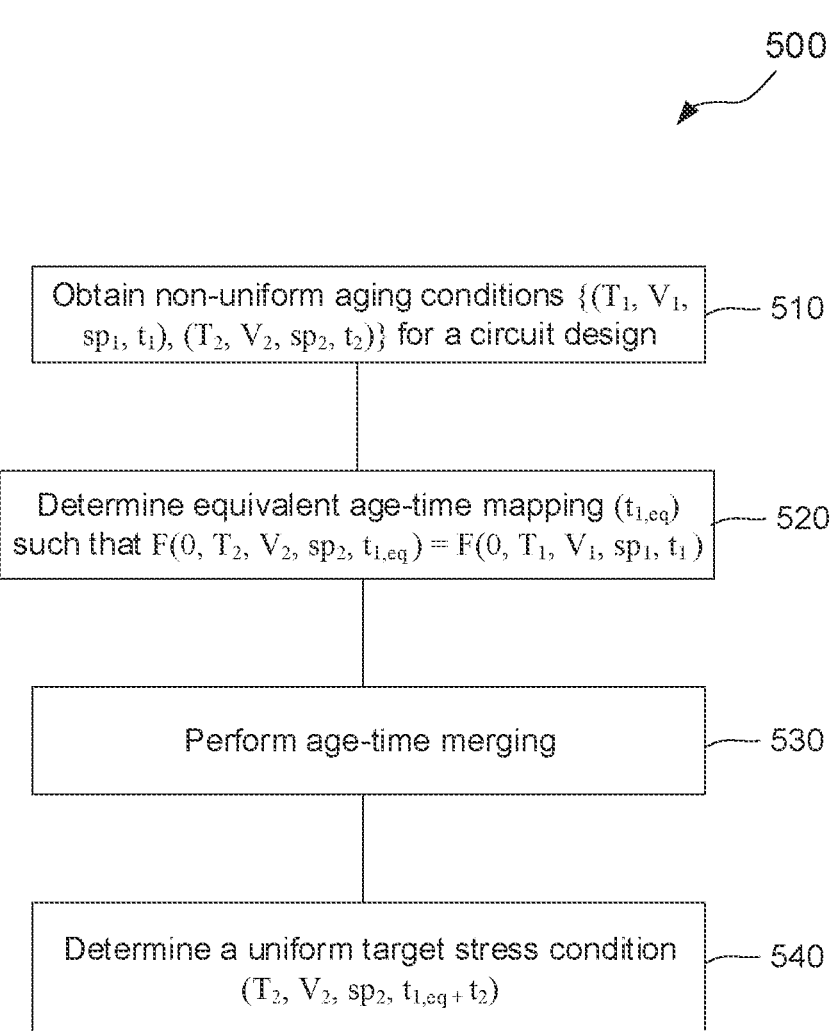
FIG. 5 depicts a flowchart of a method for combining stress conditions in accordance with some embodiments of the present disclosure.

FIG. 5 depicts a flowchart of a method 500 for transforming a non-uniform aging conditions that consists of two uniform aging conditions $(T_1, V_1, sp_1, t_1)$ and $(T_2, V_2, sp_2, t_2)$ into a uniform stress condition that can be consumed by 320 while using reduced processor resources and processing time.

At 510 of the method 500, the non-uniform aging conditions $\{(T_1, V_1, sp_1, t_1), (T_2, V_2, sp_2, t_2)\}$ for a circuit design are obtained. At 520 of the method 500, the equivalent age-time $(t_{1,eq})$ at the end of the first aging condition is determined such that $F(0, T_2, V_2, sp_2, t_{1,eq})=F(0, T_1, V_1, sp_1, t_1)$. This process is called equivalent age-time mapping. At 530 of the method 500, age-time merging is performed to combine the age-times $t_{1,eq}$ and $t_2$ using Equation 3, which yields a uniform target stress condition $(T_2, V_2, sp_2, t_{1,eq}+t_2)$ at 540 of the method 500. The aging engine 112 obtains the non-uniform aging conditions, transforms the non-uniform aging conditions into an equivalent uniform stress condition at 540 of the method 500. The equivalent uniform stress condition can be directly consumed when performing 320 of method 300.

Figure 6:
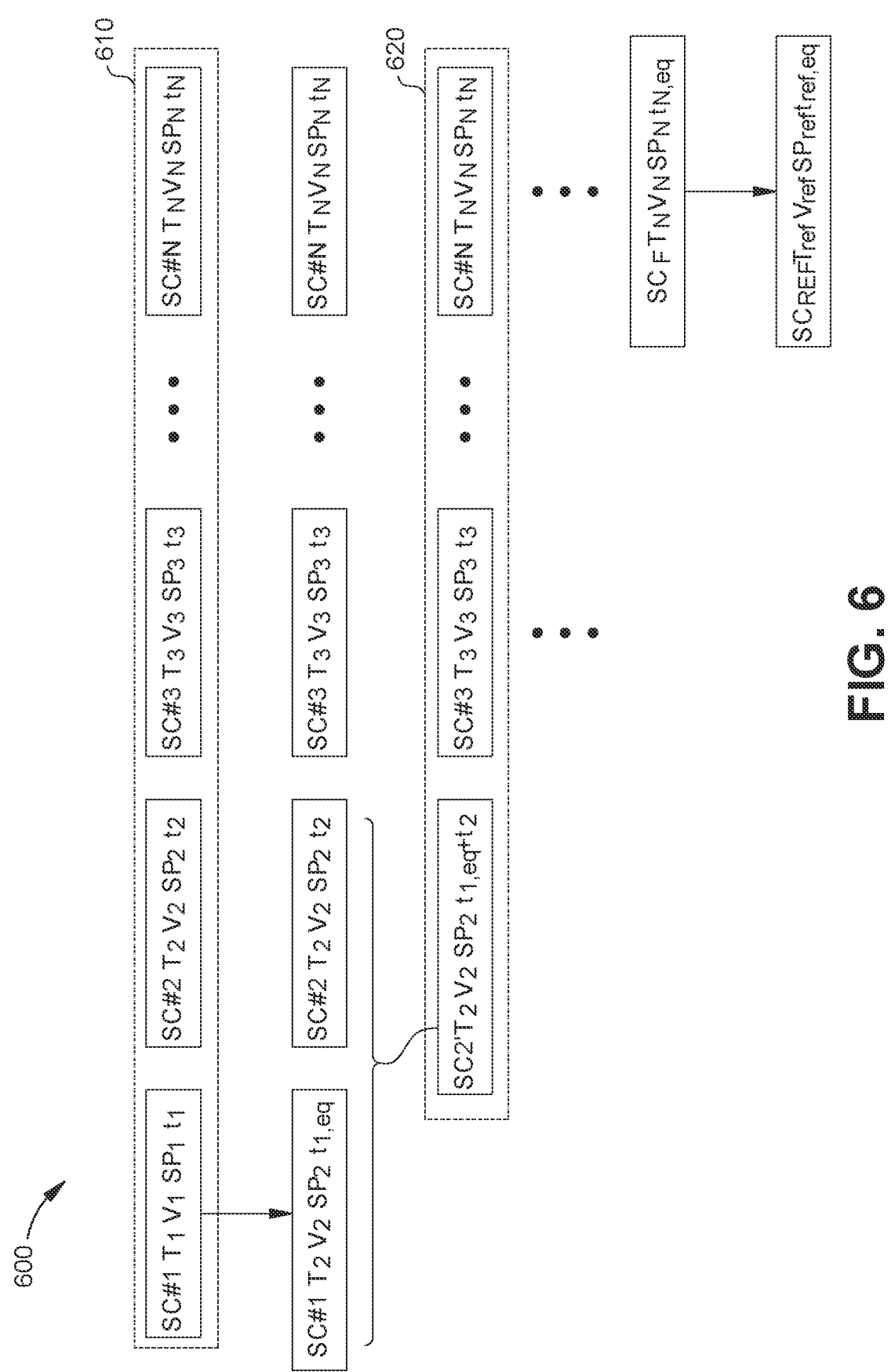
FIG. 6 depicts stress conditions for a cell of a circuit design in accordance with some embodiments of the present disclosure.

The method 500 can be extended recursively to treat a non-uniform stress condition consisting of more than two uniform stress conditions, as described in FIG. 6. With reference to FIG. 6, each of the stress conditions 610 includes a different time period. For example, the stress condition SC1 includes time parameter $t_1$, the stress condition SC2 includes time parameter $t_2$, the stress condition SC3 includes time parameter $t_3$, and the stress condition SCN includes time parameter $t_N$.

Further, the stress condition SCi includes temperature stress parameter $T_i$, voltage stress parameter $V_i$, and signal probability parameter $SP_i$, where i=1, 2, or more.

In 615 of FIG. 6, the aging engine 112 determines an equivalent time period $t_{1,eq}$ for time period $t_1$ in case the stress parameters during period $t_1$ were the same as the stress parameters $T_2$, $V_2$, and $SP_2$. In one example, the aged timing model determined at 330 of the method 300 is used to determine the equivalent time period $t_{1,eq}$. For example, Equation 1 is used to determine a change in arc delay based on the parameters of the stress condition SC1. Equation 1, the change in arc delay for the stress condition SC1, and the stress parameters of the stress condition SC2 are used to determine the equivalent time period $t_{1,eq}$. The equivalent time period $t_{1,eq}$ is determined such that applying the stress parameters $T_2$, $V_2$, and $SP_2$ for a time period of $t_{1,eq}$ yields the same change in arc delay as applying the stress parameters $T_1$, $V_1$, and $SP_1$ for a time period of $t_1$. In other words, the stress condition SC1 can be replaced by an equivalent stress condition that applies the stress parameters $T_2$, $V_2$, and $SP_2$ for a time period $t_{1,eq}$.

At 620 of FIG. 6, and 530 of method 500, the first and second stress conditions are combined. For example, with reference to FIG. 6, the aging engine 112 combines (e.g., merges) the updated stress condition SC1 and with the stress condition SC2 to generate the stress condition SC2'. The stress condition SC2' applies the stress parameters T2, V2, SP2 for a period of $t_{1,eq}+t_2$. The stress condition SC2' is the stress condition SC2 having a time parameter based on the equivalent time period $t_{1,eq}$ added to the time period $t_2$.

The stress conditions are recursively combined (merged) to generate a single combined stress condition $SC_F$. For example, for the stress conditions 620, the stress condition SC2' and the stress condition SC3 are combined as is described above with regard to stress condition SC1 and SC2. Stress conditions are combined as is described above with regard to 520 and 530 of FIG. 5 (or with regard to 620 of FIG. 6) until a final single stress condition, e.g., stress condition $SC_F$ of FIG. 6, is determined.

The method as illustrated and described with regard to FIG. 6 is performed for each cell type within a circuit design (e.g., the circuit design 200 of FIG. 2), generating a final stress condition $SC_F$ for each cell type. The aging engine 112 determines the aging effect of each cell (320) of a circuit design based on the final stress condition $SC_F$ and produces an aged timing model for the corresponding cell type (330). The timing analysis engine 110 generates a final analysis for a circuit design 132 based on the aged timing model 330 without any additional characterization of each cell within the circuit design 132.

In one or more examples, for an accumulated age function F(0, T, V, sp, t) that may be fit into the form of $D(T, V, sp)t^n$, where n is independent of T, V, and sp, the method 500 may be used to determine $t_{m-1,eq}$, where $$t_{m-1,eq} = \left(D_1^{1/n}t_1 + D_2^{1/n}t_2 + \ldots + D_{m-1}^{1/n}t_{m-1}\right)/D_m^{1/n},$$

and $D_i=D(T_i, V_i, sp_i)$. Setting m equal (N−1) provides a total accumulated age during $t_1+t_2+ \ldots +t_n$ to be

11

$$\left(D_1^{1/n}t_1 + D_2^{1/n}t_2 + ... + D_n^{1/n}t_n\right)^n.$$

Figure 7:
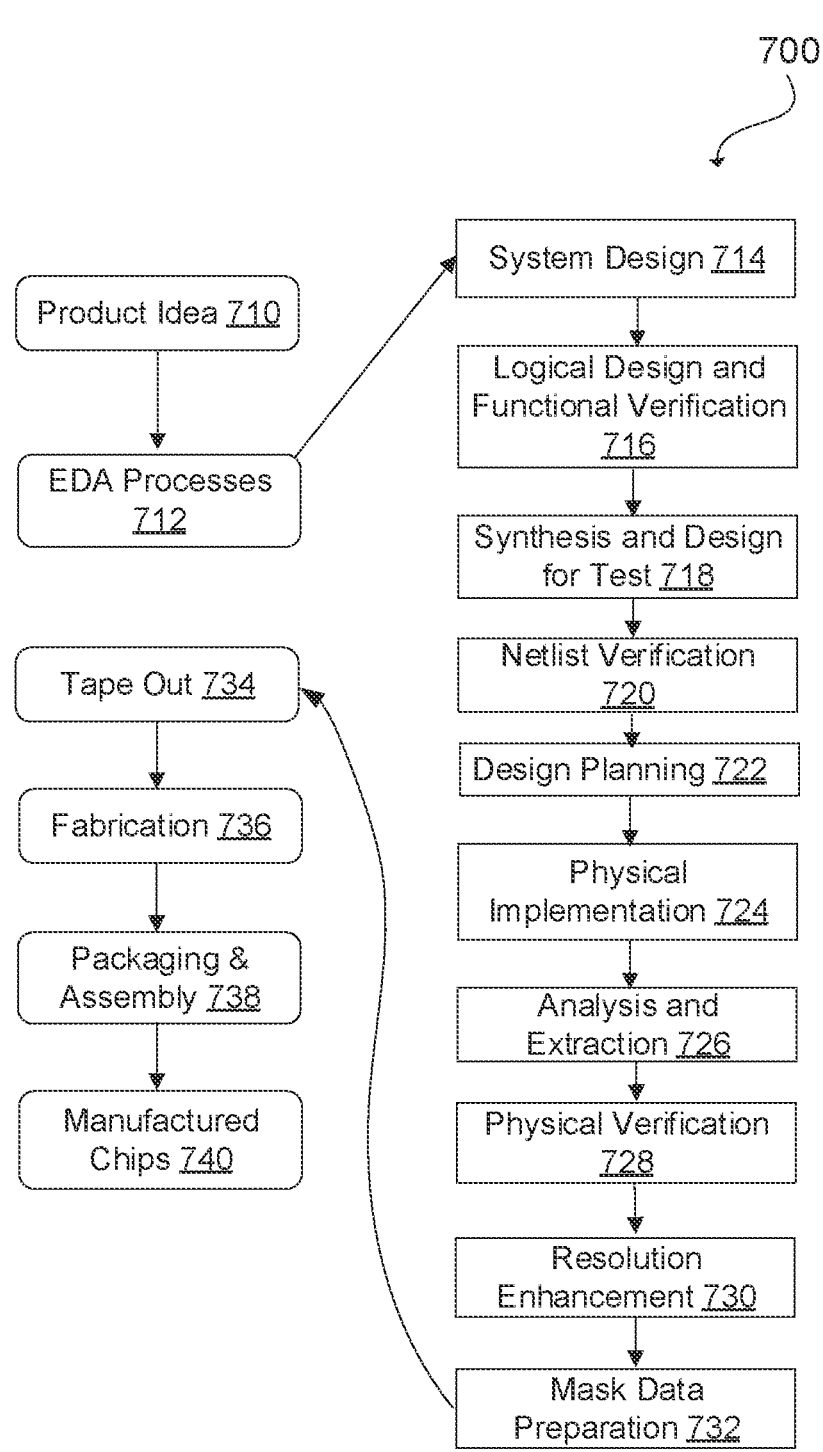
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. In one or more examples, during the analysis and extraction 726 static timing analysis (STA) is performed. For example, the process of the circuit evaluation engine 100, the method 300 and/or the method 500 may be performed as part of the process analysis and extraction 726. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 9) may be used to store the programs and data structures that are used by some or all of the EDA products described herein, and products used for development of cells for the library and for physical and logical design that use the library.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830. The processing device 802 is an example processing device that may be used as a processing device within the circuit evaluation engine 100, the aging engine 110, and/or the cell cauterization engine 120.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media. The instructions 826 are example instructions that may be executed by a processor device of the circuit evaluation engine 100, the aging engine 110, and/or the cell cauterization engine 120.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
obtaining a circuit design comprising cells, wherein the cells are associated with cell types;
determining, for each of the cell types in the circuit design, aging parameters of a core analytical model to generate a calibrated analytical model;
determining, by one or more processors, aging effects for the cells based on the calibrated analytical model and target stress conditions, wherein at least one of the target stress conditions is based on an equivalent uniform stress condition determined by combining uniform stress conditions of a non-uniform stress condition; and
determining, by the one or more processors, an aged timing model for the cell types based on the aging effects, an unaged timing model, and the target stress conditions.

2. The method of claim 1, wherein the calibrated analytical model maps the target stress conditions to the aging effects.

3. The method of claim 1, wherein the aging effects include a change in cell-level timing characteristics or transistors-level parameters.

4. The method of claim 1, wherein the aged timing model comprises delay, transition time, or effective current source associated to a cell timing arc.

5. The method of claim 1 further comprising consuming the aged timing model to determine the delay of the circuit design.

6. The method of claim 1, wherein the target stress conditions include uniform stress conditions that are non-varying in time or non-uniform stress conditions that vary in time.

7. The method of claim 1, wherein the non-uniform stress condition comprises N time durations, $T_1, T_2, \ldots T_N$, within each of which there being one of the uniform stress conditions.

8. The method of claim 7 further comprises: (1) determining an equivalent time duration $T_{1(eq)}$ for a second stress condition to produce the same amount of aging effect as a first stress condition; (2) combining the first stress condition and a second stress condition into a single uniform stress condition that lasts for the duration of $T_{1(eq)}+T_2$ under the second stress condition; and (3) combining all remaining N−1 stress conditions into a single equivalent uniform stress condition by repeatedly performing (1) and (2).

9. A system comprising:
a memory storing instructions; and
a processor, coupled with the memory and configured to execute the instructions, the instructions when executed cause the processor to:
obtain a circuit design comprising cells, wherein the cells are associated with cell types;
determine, for each of the cell types in the circuit design, aging parameters of a core analytical model to generate a calibrated analytical model;
determine aging effects for the cells based on the calibrated analytical model and target stress conditions, wherein at least one of the target stress conditions is based on an equivalent uniform stress condition determined by combining uniform stress conditions of a non-uniform stress condition; and
determine an aged timing model for the cell types based on the aging effects, an unaged timing model, and the target stress conditions.

10. The system of claim 9, wherein the calibrated analytical model maps the target stress conditions to the aging effects.

11. The system of claim 9, wherein the aging effects include a change in cell-level timing characteristics or transistors-level parameters.

12. The system of claim 9, wherein the aged timing model comprises delay, transition time, or effective current source associated to a cell timing arc.

13. The system of claim 9, wherein the processor is further configured to consume the aged timing model in order to determine the delay of the circuit design.

14. The system of claim 9, wherein the target stress conditions include uniform stress conditions that are non-varying in time or non-uniform stress conditions that vary in time.

15. The system of claim 9, wherein the target stress condition is determined based on a non-uniform stress condition comprises N time durations, within each of which there being one of the uniform stress conditions.

16. The system of claim 15, wherein an equivalent duration of a first stress condition is determined based on an aging effect under the first stress condition, the calibrated analytical model that maps the target stress conditions to the aging effects, and stress parameters of a second stress condition.

17. The system of claim 16, wherein the first stress condition and the second stress condition are combined by adding a time duration of the second stress condition to the equivalent duration of the first stress condition.

18. A non-transitory computer readable medium comprising stored instructions, which when executed by a processor, cause the processor to:
obtain a circuit design comprising cells, wherein the cells are associated with cell types;
determine, for each of the cell types in the circuit design, aging parameters of a core analytical model to generate a calibrated analytical model;
determine aging effects for the cells based on the calibrated analytical model and target stress conditions, wherein at least one of the target stress conditions is based on an equivalent uniform stress condition determined by combining uniform stress conditions of a non-uniform stress condition; and
determine an aged timing model for the cell types based on the aging effects, an unaged timing model, and the target stress conditions.

19. The non-transitory computer readable medium of claim 18, wherein the calibrated analytical model maps the target stress conditions to the aging effects, wherein the aging effects include a change in cell-level timing characteristics or transistors-level parameters, and wherein the aged timing model comprises a delay, a transition time, or an effective current source associated to a cell timing arc.

20. The non-transitory computer readable medium of claim 18, wherein the non-uniform stress condition comprises N time durations, $T_1, T_2, \ldots T_N$, within each of which there being one of the uniform stress conditions.

\* \* \* \* \*